Dec. 7, 1965   V. K. ELORANTA   3,222,170
PHOTOGRAPHIC PROCESS FOR FORMING A PHOTOSENSITIVE ARTICLE
WITH A PROCESSING SOLUTION SPREAD THEREON
Original Filed Aug. 29, 1958   6 Sheets-Sheet 1

INVENTOR.
Vaito K. Eloranta
BY
Brown and Mikulka
and Robert E. Corb
ATTORNEYS

INVENTOR.
Vaito K. Eloranta
BY Brown and Mikulka
and Robert E. Corb
ATTORNEYS

United States Patent Office 3,222,170
Patented Dec. 7, 1965

3,222,170
PHOTOGRAPHIC PROCESS FOR FORMING A PHOTOSENSITIVE ARTICLE WITH A PROCESSING SOLUTION SPREAD THEREON
Vaito K. Eloranta, Needham, Mass., assignor to Polaroid Corporation, Cambridge, Mass., a corporation of Delaware
Original application Aug. 29, 1958, Ser. No. 757,976, now Patent No. 2,791,703, dated July 11, 1961. Divided and this application Sept. 8, 1960, Ser. No. 54,740
10 Claims. (Cl. 96—29)

This application is a division of my application Serial No. 757,976, filed August 29, 1958, now U.S. Pat. 2,791,703.

This invention relates to novel photographic methods of processing photosensitive sheet materials and more particularly to methods of processing photosensitive sheet materials by distributing a fluid composition in a layer thereon.

A number of forms of photographic apparatus has been proposed for processing photosensitive sheet materials by spreading a preferably viscous fluid composition in a layer thereon. This spreading of the processing fluid is effected by superposing the photosensitive sheet with a second sheet, providing a quantity of fluid between the sheets and moving the sheets in superposed position relative to and between a pair of juxtaposed members for spreading the fluid in a thin layer between the superposed sheets.

An object of the invention is to provide new and improved photographic methods of spreading a viscous fluid in a thin layer between a pair of superposed photographic sheets.

Another object of the invention is to provide a method of distributing a viscous fluid, during spreading of the fluid between a pair of superposed sheets, by advancement of the sheets between a pair of juxaposed members so that the fluid flows transversely to the direction of advancement of the sheets as well as longitudinally of the direction of advancement of the sheets.

A further object of the invention is to provide photographic methods of simultaneously applying compressive pressure to a pair of superposed sheets along spaced lines for predeterminedly distributing a fluid between said sheets and spreading said fluid as it is distributed in a thin layer between said sheets.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a further understanding of the nature and objects of the invention, reference should be had to the following detailed description taken in connection with the accompanying drawings wherein.

The photographic apparatus described in the present application generally includes means for spreading a viscous processing fluid between a pair of superposed sheets. This fluid-spreading means comprises a pair of juxtaposed members between which the superposed sheets are moved for spreading the fluid. The juxtaposed members may be biased toward one another or may be spaced a fixed distance apart so as to provide a fixed gap through which the sheets are moved. The juxtaposed members are adapted to apply compressive pressure to the sheets and may take any number of forms including rolls, bars, slots in plates, a plate and roll, and the like.

Figure 1:
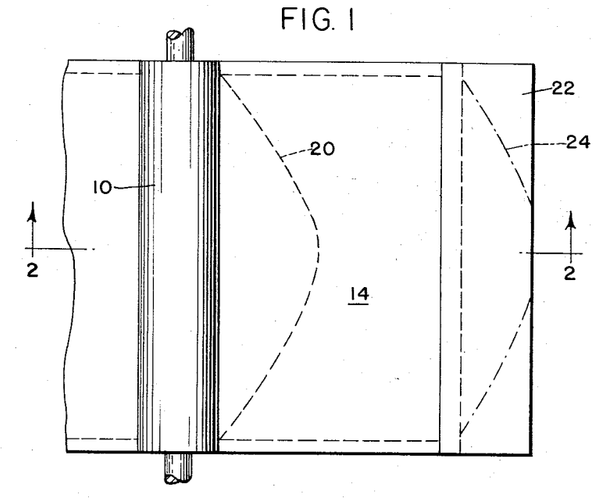
FIGURE 1 is a diagrammatic view illustrating apparatus for and a method of spreading a fluid in a thin layer between a pair of superposed photographic sheets and shows the spread of fluid obtained thereby.
Figure 2:
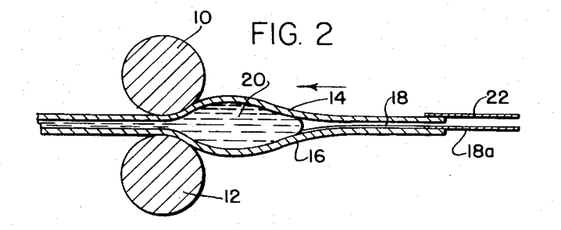
FIG. 2 is a sectional view taken along the line 2—2 of FIG. 1.

A typical pair of fluid-spreading members is illustrated in FIGS. 1 and 2 and comprises a pair of elongated, cylindrical rolls 10 and 12 located adjacent one another with their axes substantially parallel. Rolls 10 and 12 may be mounted for rotation and are biased toward one another so as to apply compressive pressure to a pair of sheets, in this case designated 14 and 16, as the sheets are moved in superposition between the rolls. The fluid to be spread between the sheets is preferably quite viscous and is provided between the sheets so that, as the sheets are moved between the rolls, the fluid is caused to be spread in a thin layer, the thickness of which is a function of the pressure applied by the rolls and, in the form shown, of a mask sheet, designated 18, located between sheets 14 and 16. The function of mask sheet 18 will be described in detail hereinafter. As the sheets with the fluid therebetween are moved between the rolls (to the left viewing FIG. 2), the fluid, designated 20, is advanced relative to and between the sheets along a front which is generally curved or tongue-shaped as illustrated in FIG. 1. This may be due in part to the way in which the fluid is initially provided between the sheets. For example, the fluid may be unevenly distributed across the the sheets, prior to spreading, with the fluid being disposed mainly at the center of the sheets intermediate their sides.

In order to insure a complete spread of the fluid in a layer of the desired thickness over a predetermined area which is preferably rectangular, the fluid is generally provided in an amount greater than the minimum required for the desired layer, and this necessity for an excess amount of fluid is only increased by the fact that the fluid is spread along a tongue-shaped front which causes a tendency, especially in the case of rectangular areas, to leave portions of the areas uncovered, particularly at the lateral edges. It will be apparent, therefore, that the amount of excess fluid could be appreciably reduced if the fluid, as it was being spread between the sheets, were advanced along a front which was approximately straight, was perpendicular to the direction of advancement and was substantially equal in length to the width of the area over which spreading was supposed to occur. It would still be desirable to provide some excess fluid in order to make sure of a complete spread over the desired area, thereby necessitating the provision of means for collecting any excess fluid which may be spread beyond the end of the desired area. This means for collecting and retaining the excess fluid generally comprises the two sheets between which the fluid is spread or another sheet or sheets asociated therewith. Provision is made for spacing the sheets comprising the fluid-collecting means apart from one another as they move between the fluid-spreading members so as to provide a space between the sheets in which the fluid is collected and retained or trapped. In the form shown in FIGS. 1 and 2, this fluid-trapping means comprises a trailing end portion 18a of mask sheet 18 and trailer sheet 22, both of which extend beyond the trailing ends of sheets 14 and 16.

The trapping means (trailing end portion 18a and trailer sheet 22) are required to be of sufficient length to collect all of the excess fluid spread beyond the trailing ends of the sheets (14 and 16), betwen which the layer of fluid is spread. The length of the trapping means is, of course, a function of the space between portion 18a and trailer sheet 22 and the amount of excess fluid which must be collected. The length of the trapping means is also a function of the distribution of the excess fluid, as is apparent in FIG. 1 of the drawings, wherein the broken line, designated 24, is shown to illustrate the tongue-shaped distribution of the excess fluid and how the trapping means might fail to collect and retain all of the excess fluid because only the central portions of the trapping means are utilized for this purpose. It should also be apparent, as illustrated in FIG. 3 of the drawings, that should the fluid be distributed along a straight front, substantially perpendicular to the direction of spreading and approximately equal in length to the width of the area, then a greater proportion of the trapping means is utilized permitting the trapping means to be made considerably shorter.

Figure 3:
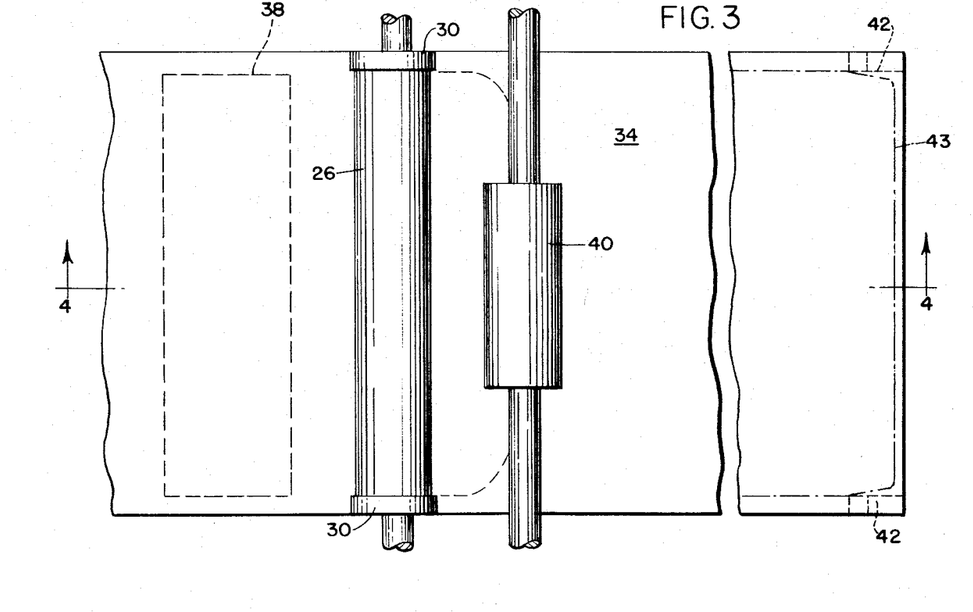
FIG. 3 is a plan view similar to FIG. 1, illustrating the method of the invention for distributing a viscous fluid between a pair of superposed sheets, as well as showing the spread of the fluid obtained thereby.
Figure 4:
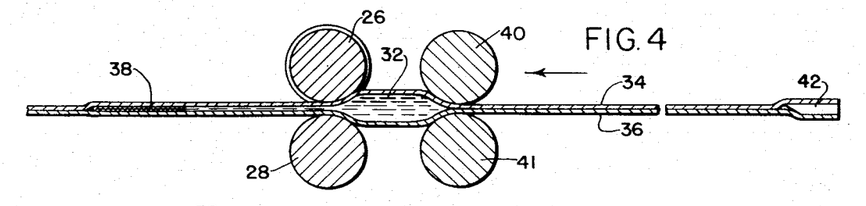
FIG. 4 is a sectional view taken along the line 4—4 of FIG. 3.

Reference is now made to FIGS. 3 and 4 of the drawings wherein there is illustrated one form of fluid-spreading apparatus for practicing the invention. The fluid-spreading apparatus in the form shown comprises a pair of elongated cylindrical rolls 26 and 28 mounted in juxtaposition with their axes substantially parallel. Rolls 26 and 28 may be fixed with respect to one another, or movable toward and away from and biased toward one another so as to apply compressive pressure to sheet materials moved therebetween. Roll 26 is provided with a pair of raised shoulders 30 adjacent its ends, adapted to bear against the lateral margins of sheets moved between the rolls, for spacing apart the intermediate portions of the rolls and controlling the thickness and area of the layer of fluid spread between the sheets.

A fluid processing composition, designated 32, is adapted to be spread between a pair of superposed sheets, designated 34 and 36, by movement of the sheets between rolls 26 and 28 (to the left viewing FIGS. 3 and 4). The processing fluid may be initially supplied in a rupturable container 38, shown in the drawings in its ruptured condition. Container 38 is formed by folding a rectangular blank of fluid-impervious sheet material longitudinally to form the walls of a container and sealing the two folded portions of the blank together at their margins to provide a fluid cavity. The longitudinal edge seal is weaker than the end seals so that it will become unsealed when compressive pressure is applied to the walls of the container. The container is located between sheets 34 and 36 adjacent the leading edge of the area over which the fluid contents of the container are to be spread with the longitudinal edge seal directed toward this area so that the container contents are discharged toward this area when compressive pressure is applied to the container.

The apparatus includes means for distributing the fluid between the superposed sheets as the sheets are advanced between rolls 26 and 28 for spreading the fluid in a thin layer. This fluid-distributing means also comprises a pair of juxtaposed members, which may take any number of forms, including fixed members or members movable with respect to one another, including bars, rolls, plates, combinations thereof and the like, and in the form shown comprises a pair of rolls 40 and 41 mounted with their axes substantially parallel to one another and the axes of rolls 26 and 28. Rolls 40 and 41 are located on the leading side of rolls 26 and 28 so as to engage sheets 34 and 36 prior to engagement of the sheets by rolls 26 and 28. Rolls 40 and 41 may be substantially shorter than rolls 26 and 28 so that they engage the superposed sheets intermediate their margins over approximately the central third of the sheets. As fluid 32 is spread (to the right) between sheets 34 and 36, rolls 40 and 41 function to inhibit or restrict the spreading of the fluid and cause the fluid to advance along a front which is approximately a straight line extending from side to side of the area of the sheets over which the fluid is being spread. Rolls 26, 28, 40 and 41 cooperate with the portions of sheets 34 and 36 located between the two sets of rolls for confining the fluid substantially to the aforementioned portions of the sheets.

As previously noted, the fluid-distributing members illustrated as rolls 40 and 41 may take any number of forms and may, if desired, extend entirely from side to side of the sheet or be shorter in length than the rolls shown and described, depending on the configuration desired for the fluid being distributed. It is desirable that the spreading members (rolls 26 and 28) accomplish the actual spreading of the fluid in a layer of the desired thickness while the distributing members (rolls 40 and 41) function to control the distribution of the fluid immediately prior to its spreading by rolls 26 and 28. Accordingly, when fluid 32 is supplied in a rupturable container of the type shown, rolls 26 and 28 must exert sufficient compressive pressure on the container to effect the release of its fluid contents. However, since rolls 40 and 41 are adapted to engage the portion of the sheets including the container prior to engagement thereof by rolls 26 and 28, rolls 40 and 41 must exert insufficient pressure to rupture the container as it is moved therebetween. Rolls 40 and 41 in the form shown engage the sheets along a line which is substantially parallel to the line of engagement of the sheets by rolls 26 and 28. This engagement of the sheets along parallel lines is preferable, regardless of the particular structure of the fluid-spreading members and the fluid-distributing members. The spacing between the two lines of engagement of the sheets by the fluid-spreading members and the fluid-distributing members is as small as possible and preferably approximately equal to or slightly less than the width of the container so that the fluid contents of the container are discharged between the two sets of members which function to confine the fluid between the portions of the sheets located between the two pairs of members. The two pairs of members should not be spaced so close together that the fluid-distributing members are acting on the container when its fluid contents are discharged. In embodiments wherein the fluid is provided between the sheets adjacent an edge of an area over which it is to be spread by other means than the container shown, this limitation on the minimum spacing of the two pairs of members is not applicable. The spacing is then only limited by the amount of fluid which must be contained between the portions of the sheets between the two pairs of members.

Trapping of excess processing fluid as previously noted can be accomplished in a number of ways utilizing a pair of sheets between which a space is provided for collecting the fluid as the sheets are moved between the fluid-spreading members. For example, the fluid-spreading members may be located a fixed distance apart or may be movable toward and away from one another with their movement toward one another restricted so that a minimum fixed distance always separates the members. In each of these instances, the trapping sheets, for example, 18a and 22 shown in FIG. 2, may be thinner than the sheets between which the fluid is to be spread, having an aggregate thickness which is less than the minimum spacing between the spreading members, so that a space is left between the trapping sheets within which excess fluid may be collected and retained. Alternatively, and particularly in embodiments of the apparatus wherein the fluid-spreading members are biased toward one another as shown in FIGS. 3 and 4, means may be provided between the trailing ends of the sheets for spacing the trailing ends apart as they move between the fluid-spreading members. A pair of spacing elements 42 is shown, for example, between the marginal portions of sheets 34 and 36 at the trailing ends of these sheets for spacing apart the fluid-spreading rolls as the trailing end portions move therebetween. A space is thereby provided between the intermediate sections of the trailing end portions of sheets 34 and 36 for collecting any excess fluid.

Broken line 43 is shown in FIG. 3 for the purpose of illustrating the configuration of the mass of fluid as it is spread between the sheets and trapped between the trailing ends thereof. While line 43 is shown as being regular and the line of advancement of the fluid is describd as being straight, it is to be understood that the showing and description are only approximations for purposes of description and that the lines may be irregular or ragged and not uniform. It is apparent from this showing that the major portion of the trapping sheets is utilized for this purpose, permitting the trapping sheets to be made shorter, yet to remain adequate for trapping the same amount of excess fluid for which considerably larger traps would have been required if the fluid were spread along a tongue-shaped front as illustrated in FIG. 1.

The apparatus for practicing the invention may take the form of a camera, camera back, film pack, film pack holder or cassette adapted to be employed with a film pack in a camera or used for a penetrative radiation such as X-rays, or a film pack holder or cassette initially including a film pack comprising a plurality of individual film units. The apparatus may take the form of a camera of the type wherein a sequence of areas of a photosensitive sheet are exposed and processed and is illustrated in FIGS. 5 through 8 as being embodied in photographic apparatus in the form of a camera 44 including means for holding a film unit or an assemblage of film units during exposure and means for feeding individual film units from the camera between the fluid-spreading members so that each film unit may be grasped for withdrawing it from the camera following exposure. In the preferred embodiment shown, these last-mentioned means for feeding the film units between the fluid-spreading members also comprise the fluid-distributing members, so that the fluid-distributing members, in this instance, perform a dual function. Camera 44 comprises a forward housing section 46 and a rear housing section 48. Forward housing section 46 includes a forward wall 50 having a recessed or reentrant section 52 including an aperture 54 through which exposure can be effected. A hinged forward wall or door 56 is provided for covering recessed section 52 and mounting a conventional lens and shutter assembly 58, the latter being connected to recessed section 52 by a collapsible bellows 60 secured at one end to the lens and shutter assembly and secured at its other end to the recessed section around aperture 54. In lieu of door 56, lens and shutter assembly 58 and bellows 60, the forward and rear housing sections of the camera could be constructed in the form of a camera back or a film pack adapter intended to be mounted on or coupled with the back of a camera.

Rear housing section 48 includes a rear wall 62 which cooperates with forward housing section 46 to provide a chamber 64 behind aperture 54 for containing a film pack, for example, of the type shown in FIGS. 10 through 13, in position for exposure across aperture 54. This film pack (to be fully described hereinafter) is adapted to be mounted in chamber 64 with the forward wall of the pack against the rear surface of recessed section 52 and with an aperture in the pack aligned with aperture 54. Rear housing section 48 is preferably pivotally mounted on forward housing section 46 adjacent one end of the housing, herein shown and designated for purposes of description as the upper end, by a hinge 68, thereby permitting the separation of the two housing sections for loading of a film pack into chamber 64. An opening 66 adapted to permit the withdrawal of a film unit is provided in the opposite (lower) end of the housing. Suitable latch means (not shown) of a conventional type are also provided in the lower end of the housing for retaining the two housing sections together in the closed or operative position shown in the drawings.

Figure 5:
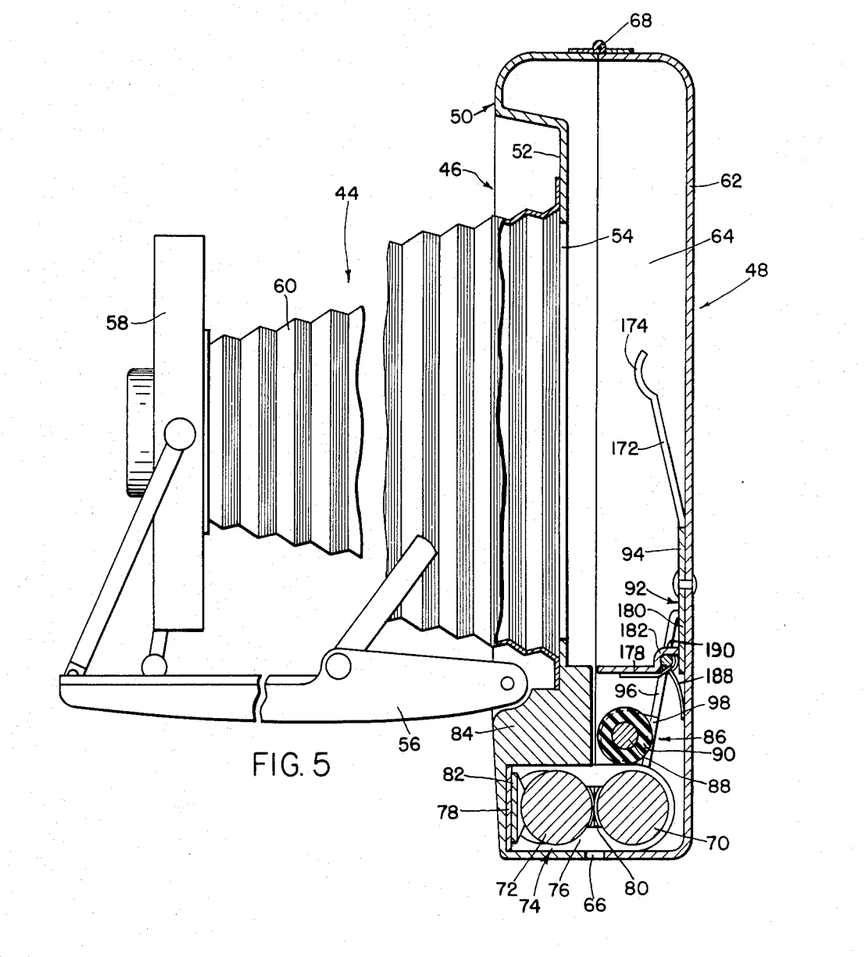
FIG. 5 is a fragmentary elevational view of photographic apparatus in the form of a camera for practicing the method of the invention, the section being taken through the camera in a plane substantially midway between its sides.

Camera 44 includes a pressure-applying device comprising a pair of pressure-applying members in the form of elongated rolls 70 and 72 mounted within the housing adjacent the lower end thereof. Pressure-applying rolls 70 and 72 are mounted for pivotal movement, in juxtaposition with their axes in a common plane, and are biased toward one another for applying compressive pressure to the sheets as the latter are drawn therebetween. Pressure-applying rolls 70 and 72 may be mounted on such a means as a generally U-shaped support member 74 having a pair of parallel arms 76 joined by a connecting member 78. Each of arms 76 is provided with a slot 80 which may be generally keyhole-shaped, and each of rolls 70 and 72 is provided with stub shafts at its ends rotatably journaled in bushings engaged in slots 80. A spring 82 is mounted intermediate its ends on connecting member 78 between the latter and roll 72 with its ends in engagement with the bushings mounted thereon for urging the latter toward roll 70.

As previously noted, one method of trapping excess processing fluid during spreading is to provide a pair of pressure-applying members constructed so that there is always a minimum fixed gap between them. Accordingly, pressure-applying rolls 70 and 72 and the bushings mounting said rolls are so constructed that the bushings engage one another and retain the rolls spaced apart from one another to provide a fixed minimum gap between the rolls, which gap has a depth substantially greater than the thickness of the trapping sheets intended to be moved between the rolls.

The camera comprises a second pair of pressure-applying members for distributing the processing fluid as it is spread between the sheets by pressure-applying rolls 70 and 72. These distributing members, in the form shown, comprise a support member 84, mounted within chamber 64 on forward housing section 46, having a support surface located substantially in a plane through the gap between pressure-applying rolls 70 and 72, and located adjacent said rolls in the lower portion of the camera housing. The other fluid-distributing member comprises a roll 86 mounted adjacent the surface of support member 84 near pressure-applying roll 70. Fluid-distributing roll 86 comprises an elongated shaft 88 for mounting the roll and a cylindrical sheet-engaging portion 90. The sheet-engaging portion is preferably formed of a friction-generating material, such as rubber, since the fluid-distributing roll also performs the function of advancing sheet materials from the film pack in which they are initially provided, between pressure-applying rolls 70 and 72, and from the camera.

As a means for mounting fluid-distributing roll 86, there is provided a generally H-shaped spring 92 having a transverse section 94 at which spring 92 is mounted on rear wall 62 within chamber 64. Spring 92 includes a first pair of arms 96 extending downwardly toward rolls 70 and 72 and forwardly toward the front of the camera. Each of arms 96 is provided at its free end with a forwardly projecting support member or tab 98 for rotatably mounting shaft 88 at opposite ends of sheet-engaging portions 90. Arms 96 function to bias fluid-distributing roll 86 toward support member 84 into engagement with sheet materials moved therebetween for applying compressive pressure to the sheet materials which is insufficient to rupture a container of processing fluid located between the sheets. Advancement of sheet materials from the camera between rolls 70 and 72 is effected by rotating fluid-distributing roll 86 in contact with a sheet positioned between the roll and support member 84. This may be effected, for example, by providing a first gear 100 on shaft 88 adapted to be engaged by a second gear 102 mounted on a shaft 104 which extends through a side of the camera housing and is connected to a manually operable lever 106 exterior of the camera housing. Suitable means, such as a conventional overrunning clutch, may be incorporated in the drive mechanism so as to permit rotation of fluid-spreading roll 86 in one direction (counterclockwise viewing FIG. 5) in response to movement of a sheet from the camera in engagement with the fluid-distributing roll while lever 106 remains stationary. This overrunning clutch could be incorporated into the driving mechanism so that lever 106 need be rotated through only a predetermined distance for advancing a pair of sheets, or leader attached thereto, from the camera a distance sufficient to permit them to be grasped manually so that the sheets may be pulled between the pressure-applying rolls from the camera. It may also be desirable to incorporate means limiting the movement of lever 106 from a rest position, together with means for returning the lever to a rest position, following rotation thereof for advancing the sheets (or a leader) between the pressure-applying rolls from the camera. Opening 66 is located in the lower end of the housing in alignment with the gap between pressure-applying rolls 70 and 72 to permit movement of sheet materials between the pressure-applying rolls and directly from the camera.

Figures 6, 9:
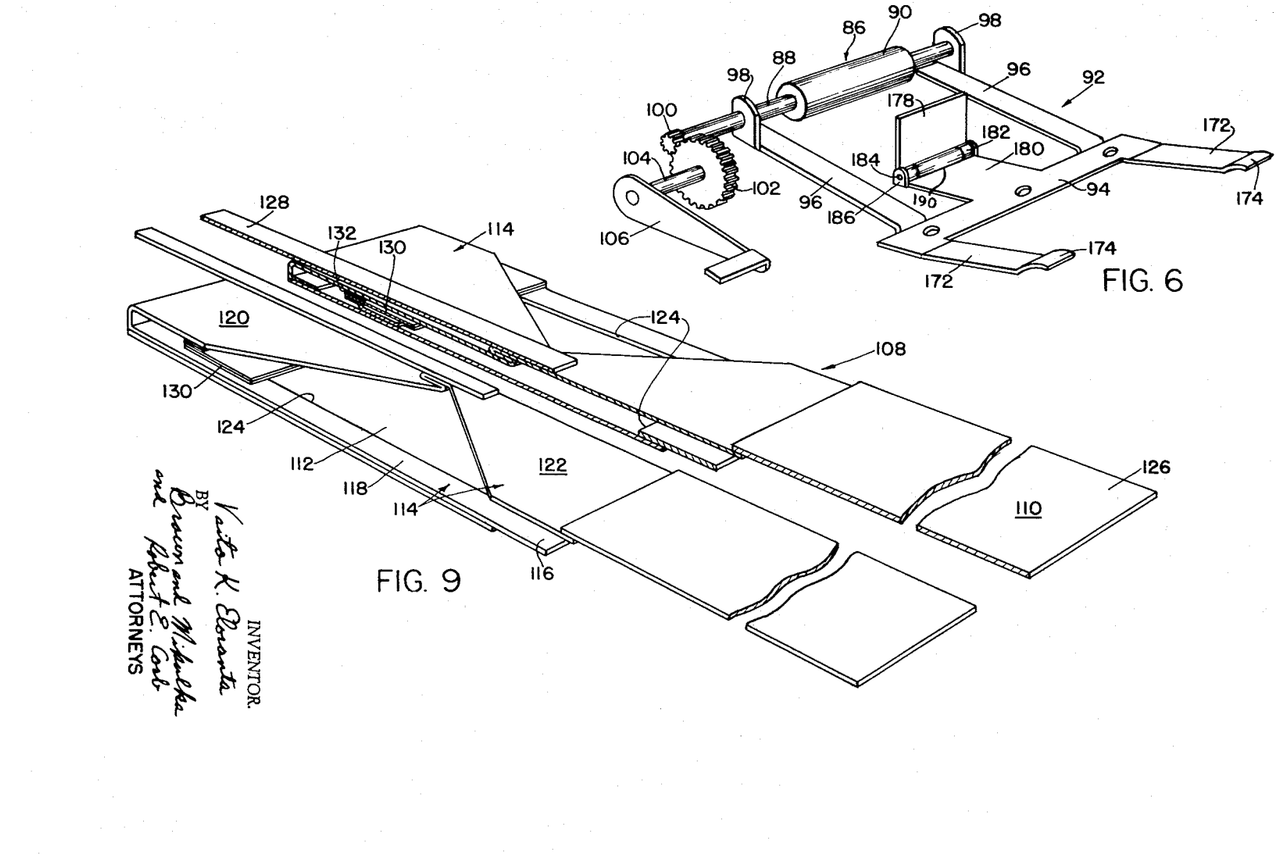
FIG. 6 is a perspective view of components of the camera of FIG. 5.
FIG. 9 is a perspective view of a film unit adapted to use in the camera of FIG. 5 for practicing the method of the invention.

Reference is now made to FIG. 9 of the drawings wherein there is illustrated one form of film unit adapted to be employed in the apparatus provided for practicing the method of the invention. This film unit, designated 108, is of the type shown and described in my copending application Serial No. 749,024, filed July 16, 1958, comprising a first or photosensitive sheet 110 and a second or image-receiving sheet 112. The photosensitive sheet is generally rectangular and comprises a layer of photosensitive material carried on a suitable support. The photosensitive material may comprise any of the materials used in photography including, for example, the silver halides or other photosensitive heavy metal salts capable of having a developable latent image formed therein by exposure, the ferric salts, and diazonium compounds. The support for the photosensitive layer may comprise any of the flexible sheet materials generally used for film bases, including paper, plastics and the like, and is preferably opaque to light actinic to the photosensitive material. Second sheet 112 is at least coextensive in area with the area or frame of the photosensitive sheet to be exposed and also comprises a flexible sheet material such as paper, plastic and the like. The second sheet, in the form shown, is substantially coextensive in size with the photosensitive sheet and is also opaque to light actinic to the photosensitive material. While the second sheet may merely aid in the spreading of a fluid processing composition in a thin layer on the photosensitive sheet, in a preferred form of the film unit the second sheet is adapted to provide a support for a positive transfer image produced, for example, by a silver halide diffusion-transfer reversal process such as is described in U.S. Patent No. 2,543,181, issued February 27, 1951, and U.S. Patent No. 2,662,822, issued December 15, 1953, both in the name of Edwin H. Land. The second sheet, accordingly, may comprise an image-receiving layer, such as described in the above-mentioned patents, carried on a flexible support sheet.

The photosensitive and second sheets are mounted on an elongated carrier sheet 114 formed of a flexible material such as paper, plastic and the like. Carrier sheet 114 is adapted to perform several functions including providing a leader for connecting the photosensitive and second sheets, properly locating or registering the sheets relative to one another when the sheets are superposed, mounting a container of a fluid processing composition, controlling the spreading of the fluid in a layer of predetermined thickness between the photosensitive and second sheets, determining the area to be processed and the dimensions of the transfer image produced in the second sheet, and collecting any excess processing fluid. Carrier sheet 114 comprises a trailing end section 116 and a rectangular intermediate section 118, preferably coextensive with second sheet 112, a first tapered or convergent section 120 and a second tapered or convergent section 122, the latter two sections being adapted to function as leaders and for mounting a container of processing fluid. Image-receiving sheet 112 is mounted on intermediate section 118 with the receiving layer of sheet 112 located adjacent the carrier sheet. Intermediate section 118 is provided with a generally rectangular aperture 124 defining the area of the image-receiving sheet against which the fluid processing composition is spread and wherein a transfer image is produced. The lateral margins of intermediate section 118 adjacent the sides of aperture 124 define a mask for confining the processing fluid between the sheets and for controlling the thickness of the layer of fluid spread between the sheets. Photosensitive sheet 110 is secured at its leading edge to the end edge of second tapered section 122, with the emulsion surface of the photosensitive sheet facing in the same direction, relative to the carrier sheet, as the image-receiving layer of second sheet 112. Photosensitive sheet 110 is substantially longer than aperture 124 and the area to be exposed and processed so as to provide a trailing end section, designated 126, adapted to cooperate with trailing end section 116 for collecting and retaining excess processing fluid. A narrow elongated leader strip 128 is provided secured to second tapered section 122 at the junction of sections 120 and 122 substantially midway between the leading edges of second sheet 112 and photosensitive sheet 110. Each of leaders 128 is provided, adjacent its leading end, with a buttonhole-shaped opening 129. As each film unit is withdrawn from the camera and the fluid processing composition is spread between the photosensitive and second sheets laminating them together, processing is commenced, and the sheets must be maintained in the superposed or laminated condition for a predetermined processing period. Holding the film unit during this processing period may present a problem and, in order to leave the operator's hands free during this period, the buttonhole-shaped openings are provided so that the operator can conveniently suspend the film unit from a button on his clothing.

The first and second tapered sections of the carrier sheet are adapted to be folded along a transverse line midway between the photosensitive and second sheets, and the film unit is processed by drawing leader 128 and the tapered sections in superposed relation between the fluid-spreading members. The photosensitive and second sheets are thus registered with one another in superposed relation by drawing on leader 128. As a means for overcoming any tendency for leader 128 to peel from second tapered section 122 where the leader and the tapered section are attached, the two tapered sections 120 and 122 are made somewhat longer than the minimum required. The first tapered section is folded back upon itself and portions of the surface of the tapered sections opposite leader 120 on both sides of the line mentioned are folded or creased (midway between the photosensitive and second sheets), and are adhered to one another so that the bond between second tapered section 122 and leader 128 will always be subjected to shear stress.

The photosensitive and second sheets are adapted to be processed by a fluid composition carried in a rupturable container 130 mounted on first tapered section 120. The container is formed in the manner previously described and shown, for example, in the above-mentioned U.S. Patent No. 2,543,181. Container 130 is mounted on first tapered section 120 on the side thereof opposite second sheet 112 by a hinge strip 132. The container extends substantially from side to side of the carrier sheet, and the liquid cavity of the container is preferably at least equal in length to the width of aperture 124 in the carrier sheet. Container 130 is mounted with the longitudinal edge seal, which is adapted to become unsealed, facing the second sheet and located adjacent the leading edge thereof. Film unit 108 when assembled for exposure is positioned with first and second tapered sections 120 and 122 folded, at the first tapered section adjacent the leading edge of the second sheet, against the image-receptive surface of the second sheet. Second tapered section 122 is folded adjacent the leading edge of photosensitive sheet 110 so that the latter lies against the first and second tapered sections with the emulsion surface of the photosensitive sheet facing in the same direction as the image-receptive surface of the second sheet. It will be noted that, in this position of film unit 108, the photosensitive layer of the photosensitive sheet is located outermost so that it can be exposed. The image-receptive layer of the second sheet faces inwardly and the first and second tapered sections of the carrier sheet are disposed between the photosensitive and second sheets. Container 130, in this assembled position of the film unit, is disposed with the longitudinal edge, which is adapted to become unsealed, facing the trailing end of the second sheet and the leading end of the photosensitive sheet. In an alternative form of the film unit, the container of processing fluid can be mounted on second tapered section 122. This may prove advantageous inasmuch as tapered section 120 is required to roll during withdrawal of the film unit and the container, if not mounted thereon, cannot interfere with this rolling action.

An assemblage of film units in the form of a film pack 134 is illustrated in FIGS. 10 through 14 of the drawings. The film pack comprises a plurality of film units 108 contained in a generally parallelepiped-shaped housing 136 having a generally rectangular forward wall 138 and a similar rear wall 140, joined by side walls 142 and an end wall 144. The film pack housing may be formed of sheet material, for example cardboard, sheet metal, plastic, and the like, possessing some rigidity. The housing includes a second end wall 146 which extends from forward wall 138 part way toward rear wall 140 forming a slot 147 between end wall 146 and rear wall 140 through which film units may be withdrawn from the housing. Forward wall 138 is provided with a rectangular exposure aperture 148 through which photosensitive elements within the film pack are adapted to be exposed.

Mounted within the film pack housing is a substantially rigid pressure plate 150 having dependent flanges 152 at its sides and a rolled end section 154 at its leading end. Pressure plate 150 is mounted within housing 136, with flanges 152 and rolled end section 154 extending toward rear wall 140 of the housing, and is so dimensioned that the pressure plate extends substantially from side to side and from end to end of the housing, and the flanges extend rearwardly so as to abut against rear wall 140.

Each film unit 108 of the film pack is disposed within the housing with the photosensitive sheet thereof located forward of pressure plate 150 between the latter and forward wall 138. The rectangular intermediate section 118 of each film unit 108 is bent around rolled end section 154, and the second sheet first and second tapered sections and leader strip are disposed behind the pressure plate between it and the rear wall of the housing. A plurality of film units 108 are provided in housing 136, each arranged in the same manner, with the photosensitive sheets arranged in one stack forward of the pressure plate and the second sheets arranged in another stack to the rear of the pressure plate. The photosensitive sheets extend across aperture 148 in position to be exposed through the aperture, and the second sheets are loosely contained to the rear of the pressure plate between flanges 152. Each leader strip 128 extends toward the leading end of the film pack and projects through slot 147 exterior of the housing.

Means are provided for precluding exposure of photosensitive sheets 110 by light entering slot 147 and, in the form shown, comprise a sheet 156 secured to the leading end of pressure plate 150 and extending forwardly to forward wall 138 and, if desired, between the forward wall and trailing end portions 126. Light seal sheet 156 extends from side to side of the film pack housing and may be secured to the forward wall or to end wall 146. The film pack assemblage also includes means for closing aperture 148 to prevent exposure of photosensitive sheets through the aperture. These last-mentioned means comprise a pair of cover sheets 158 located in superposed relation across aperture 148 between the forward wall and the foremost photosensitive sheet 110. Cover sheets 158 and light-sealing sheets 156 are formed of a light-opaque material, for example black paper, plastic or the like, and the two cover sheets are provided in superposition in order to preclude any chance of exposure of the foremost photosensitive sheet due to minute holes in the cover sheets. A leader 160 is provided, connected to the leading ends of the cover sheets at a location near the trailing end of the film pack, and extends around a rolled end section of the pressure plate, between the second elements and rear wall 140 of the housing, and thence through slot 147 at the leading end of the housing.

Means are provided for preventing light from entering the housing between forward wall 138 and cover sheets 158 and comprise, in the form shown, generally E-shaped pressure elements 162 formed in the margins of pressure plate 150. Each E-shaped pressure element 162 comprises an elongated section 164 extending close to and adjacent a margin of the pressure plate and three spring arms 166 for biasing the elongated section forward so as to press the margins of the photosensitive sheets and cover sheets toward forward wall 138. E-shaped pressure elements 162 are formed by piercing or die-cutting the pressure plate itself and, while being illustrated as being at the lateral margins, may also be provided at the leading and/or trailing end margins of the pressure plate.

The film pack housing may be adapted to be employed as a frame for a photographic print located between the pressure plate and the forward wall of the housing. For this purpose rear housing wall 140 is provided with two pairs of die-cut and scored sections, the sections of each pair comprising a support section 168 and a retaining section 170, both adapted to be folded outwardly along the scored lines (shown dotted) to form means for supporting the housing in an upright position.

Film pack 134 is adapted to be mounted within camera 44 between forward wall 50 and rear wall 62 with aperture 148 aligned with aperture 54 in recessed section 52. End wall 146 is located against support member 84 so that leader strips 128 and leader 160 extend across the support member between the latter and fluid-distributing roll 86 toward the gap between pressure-applying rolls 70 and 72. The camera includes means for biasing pressure plate 150 forward so as to retain the photosensitive sheets against forward wall 138, and the latter against recessed section 52 so that the photosensitive sheets are positioned for exposure. This last-mentioned means includes a pair of spring arms 172 comprising H-shaped spring 92, extending upwardly and forwardly within the camera housing. The free ends 174 of spring arms 172 are curved forwardly and are adapted to engage flanges 152 on pressure plate 150 for urging the pressure plate forwardly. To permit engagement of pressure plates and flanges by spring arms 172, a pair of openings 176 are provided in rear wall 140 and side walls 142 at opposite sides of the film pack housing into which ends 174 of spring arms 172 may enter for engaging flanges 152.

The camera also includes means for restricting the film units to being withdrawn from film pack 134 one at a time as the leader 128 comprising each film unit is fed between the pressure-applying rolls from the camera. This last-mentioned means includes an engagement member 178 mounted for pivotal movement on a support member 180 comprising H-shaped spring 92 and extending downwardly adjacent rear wall 62 from transverse section 94 intermediate spring arms 96. Engagement member 178 includes rolled sections 182 engaged around a pivot pin 184, engaged in upturned tabs 186 on support member 180. Engagement member 178 is biased by a torsion spring 188 in a clockwise direction (viewing FIGS. 5 and 6), and its clockwise pivotal movement is limited by a brace 190 so that the engagement member extends forwardly toward the rear surface of support member 84, to a point closely adjacent said surface. Engagement member 178 is adapted to be located in the path of movement of film units from the film pack through slot 147, and the force of spring 188 is sufficient to prevent the movement of all but the film unit being advanced by a leader 128. Sufficient force is exerted on each film unit during its withdrawal to deflect engagement member 178 and permit the withdrawal of the film units in proper sequence from the film pack.

To practice the method of the invention with the camera shown and employing a film pack 134 loaded therein as described, the operator pivots lever 106 for rotating fluid-distributing roll 86, located in engagement with leader 160, for advancing the leader between rolls 70 and 72 and through passage 66 from the housing, whereupon the leader may be grasped for withdrawing cover sheets 158 from the film pack to permit exposure of the photosensitive sheets. Following exposure of a photosensitive sheet, lever 106 is again pivoted for advancing a leader 128, attached to the exposed film unit, between pressure-applying rolls 70 and 72 and through passage 66 from the camera housing where the leader may be grasped for first drawing the photosensitive sheet around the rolled end section 154 of pressure plate 150 into superposition with the second sheet of the film unit and then drawing the two sheets in superposition from the camera between the pressure-applying members. As the container of processing fluid moves between fluid-distributing roll 86 and support member 84, the container is compressed sightly, but not ruptured, and thereafter is ruptured to release its contents as the container moves between pressure-applying rolls 70 and 72. Continued withdrawal movement of the film unit causes spreading of the processing fluid by pressure-applying rolls 70 and 72 while fluid-distributing roll 86 and support member 84 cooperate to effect the proper distribution of the processing fluid as it is being spread. Trapping of excess processing fluid is effected by trailing end section 116 and trailing end 126 as they move between the pressure-applying rolls, by virtue of the fact that the minimum gap between the rolls is greater than the combined thickness of trailing end section 116 and trailing end 126. A greater amount of excess fluid can be trapped, using shorter end sections, by providing a greater space between end sections, for example, by the provision of spacing members such as are shown at 42 in FIGS. 3 and 4 of the drawings.

Figure 7:
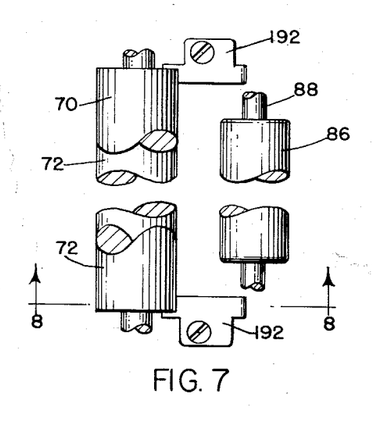
FIG. 7 is a fragmentary plan view illustrating a modified portion of the camera of FIG. 5.
Figure 8:
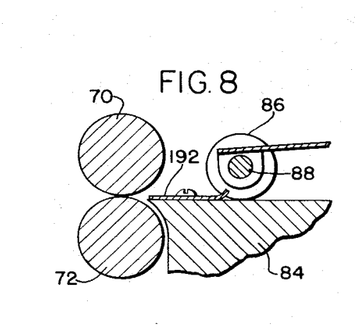
FIG. 8 is a sectional view taken along the line 8—8 of FIG. 7.
Figure 10:
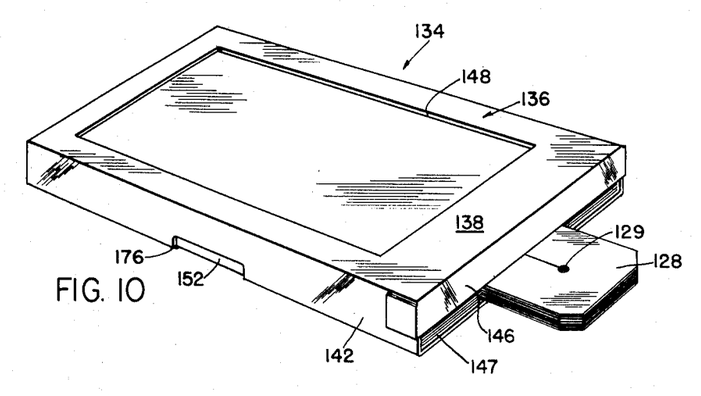
FIGS. 10 and 11 are front and rear perspective views, respectively, of an assemblage of film units adapted to be employed in the camera of FIG. 5.
Figure 11:
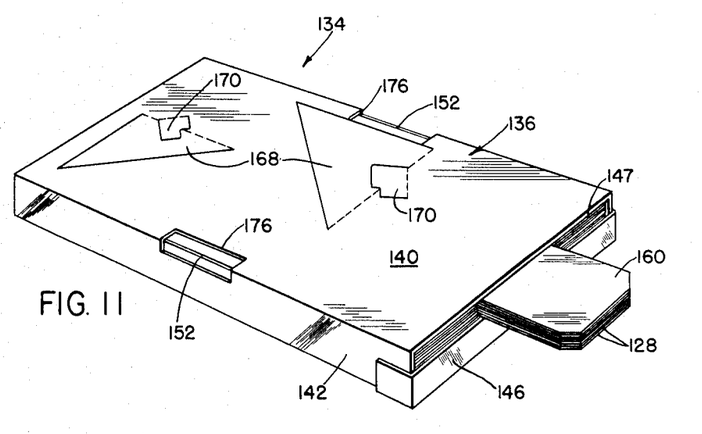
Figures 12, 13, 14:
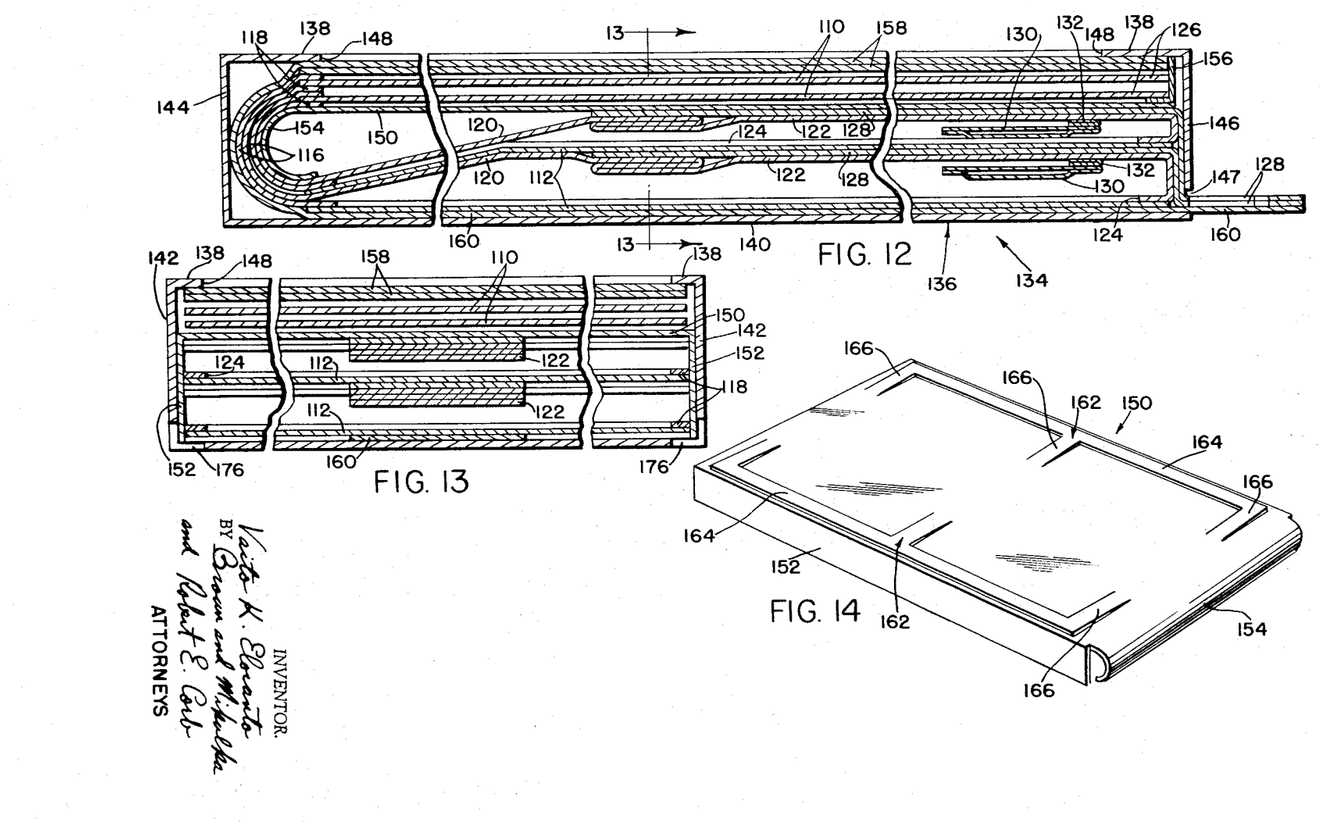
FIG. 12 is a sectional view of the film assemblage of FIGS. 10 and 11 taken through a plane located substantially midway between the sides thereof.
FIG. 13 is a sectional view taken along the line 13—13 of FIG. 12.
FIG. 14 is a perspective view of a component of the film assemblage of FIGS. 10 and 11.

As a photosensitive and second sheet are moved between pressure-applying rolls 70 and 72, the marginal portions of rectangular intermediate section 118 of carrier sheet 114 function to confine the spread of the fluid between the margins of the photosensitive and second sheets. However, the distributing members tend to cause a lateral flow of the processing fluid which may result in some of the fluid escaping from between the margins of the sheets. Accordingly, means may be provided, as illustrated in FIGS. 7 and 8, for applying compressive pressure to the margins of the sheets in the regions thereof located between the pressure-applying rolls and the fluid-distributing members. This auxiliary pressure-applying means may take a number of forms and, as shown, comprises a pair of engagement elements 192 secured to support member 84, for example, so as to bear against and apply compressive pressure to the margins of the sheets just prior to their entry between rolls 70 and 72 as the margins of the sheets are moved between engagement elements 192 and the rear surface of support member 84. Other forms of means for applying compressive pressure to the margins of the sheets as they are moved between the pressure-applying members may include rolls adapted to engage the margins of the sheets, or enlarged deformable rolls mounted on shaft 88 in engagement with the margins of the sheets as the latter move between said deformable rolls and the rear surface of support member 84.

Since certain changes may be made in the above process without departing from the scope of the invention herein involved, it is intended that all matter contained in the above description or shown in the accompanying drawings shall be interpreted as illustrative and not in a limiting sense.

What is claimed is:

1. A method of distributing a photographic liquid in contact with an area of a first photographic sheet to produce a composite photographic structure comprising a plurality of superposed layers, at least one of said layers including said liquid and at least one of said layers including a photographic image-recording material, said method comprising:

superposing said first sheet with a second sheet;

dispensing a quantity of said processing liquid from a container located between said sheets in a mass between said sheets adjacent an end edge of said area;

moving said sheets and mass of liquid relative to means for applying compressive pressure to said sheets, in a direction opposite the direction of distribution of said liquid in contact with said area;

during movement of said sheets, applying compressive pressure to a first transverse section of said superposed sheets ahead of said mass of liquid to distribute said liquid in contact with said area and cause said liquid to flow in a direction opposite the direction of movement of said sheets toward the opposite end edge of said area; and, simultaneously applying compressive pressure to a second transverse section of said superposed sheets behind said mass of liquid to restrict said flow of said liquid and cause said liquid to flow transversely of said direction of movement of said sheets.

2. In the method of claim 1, applying compressive pressure to said sheets adjacent the lateral edges of said area intermediate said first and second transverse sections to confine said liquid between said sheets.

3. The method of claim 1 in which said first transverse section extends at least from side to side of said area and said second transverse section extends across only a medial portion of said area.

4. In the method of claim 1, applying substantially greater compressive pressure to said sheets at said first transverse section than at said second transverse section.

5. The method of claim 1 in which said processing liquid is provided in a rupturable container disposed between said sheets adjacent said end edge of said area for movement with said sheets and said liquid is dispensed from said container between said sheets intermediate said first and second transverse sections by moving said container together with said sheets relative to said means for applying compressive pressure and applying compressive pressure to said sheets and said container at said first transverse section.

6. The method of claim 5 in which compressive pressure is first applied to said container at said second transverse section during movement of said sheets and container relative to said pressure-applying means and the pressure applied at said second transverse section is insufficient to rupture said container and dispense its liquid contents.

7. A method of distributing a photographic liquid in contact with a substantially rectangular area of a first photographic sheet to produce a composite photographic structure comprising a plurality of superposed layers, at least one of said layers including said liquid and at least one of said layers including a photographic image-recording material, said method comprising:
  superposing said first sheet, including said area, with a second sheet;
  dispensing a quantity of said processing liquid from a container located between said sheets in a mass between said sheets adjacent an end edge of said area;
  moving said sheets and mass of liquid relative to means for applying compressive pressure to said sheets in a direction opposite the direction of distribution of said liquid in contact with said area;
  during movement of said sheets, applying compressive pressure to a transverse portion of said superposed sheets at a first position ahead of said mass of liquid to distribute said liquid in contact with said area and cause said liquid to flow toward the opposite end edge of said area; and,
  simultaneously applying compressive pressure to a transverse portion of said superposed sheets at a second position behind said mass of liquid to restrict said flow of liquid and cause said liquid to flow transversely of said direction of movement of said sheets toward the lateral edges of said area.

8. The method of claim 7 in which said processing liquid is provided in a rupturable container positioned between said sheets adjacent said end edge of said area, said container is moved together with said sheets relative to said means for applying compressive pressure, and compressive pressure is applied to said container and said sheets at said first position to rupture said container and dispense said processing liquid therefrom in said mass.

9. The method of claim 8 in which compressive pressure is applied to said sheets and said container at said second position without rupturing said container.

10. The method of claim 9 in which said means for applying compressive pressure to said sheets at said second position is moved in engagement with said sheets for moving said sheets into engagement with said means for applying compressive pressure to said sheets at said first position.

References Cited by the Examiner

UNITED STATES PATENTS

| | | | |
|---|---|---|---|
| 2,558,858 | 7/1951 | Land | 95—13 |
| 2,612,449 | 9/1952 | Land | 96—76 |
| 2,674,532 | 4/1954 | Pierce | 96—29 |
| 2,686,716 | 8/1954 | Land | 96—29 |
| 2,778,269 | 1/1957 | Bartlett. | |
| 2,845,850 | 8/1958 | Bing et al. | 95—13 |
| 2,846,309 | 8/1958 | Land | 96—29 |
| 3,047,387 | 7/1962 | Land | 96—29 X |

NORMAN G. TORCHIN, *Primary Examiner.*

PHILIP E. MANGAN, *Examiner.*